(12) United States Patent
Agur et al.

(10) Patent No.: US 7,560,505 B2
(45) Date of Patent: Jul. 14, 2009

(54) WAX EMULSION FOR EMULSION AGGREGATION TONER

(75) Inventors: Enno E. Agur, Toronto (CA); Joseph A. Bartel, Dublin, CA (US); Patricia A. Burns, Milton (CA); Danielle C. Boils-Boissier, Mississauga (CA); Sheau V. Kao, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/054,069

(22) Filed: Mar. 24, 2008

(65) Prior Publication Data

US 2008/0171283 A1 Jul. 17, 2008

Related U.S. Application Data

(62) Division of application No. 10/859,967, filed on Jun. 4, 2004.

(51) Int. Cl.
*C08J 3/22* (2006.01)

(52) U.S. Cl. ............... 524/487; 524/488; 524/489; 524/585

(58) Field of Classification Search .......... 524/488, 524/487, 489, 585
See application file for complete search history.

(56) References Cited

U.S. PATENT DOCUMENTS

| | | | |
|---|---|---|---|
| 3,520,842 A * | 7/1970 | Crean | ............ 524/238 |
| 5,106,715 A | 4/1992 | Matsumura et al. | |
| 5,278,020 A | 1/1994 | Gushkin et al. | |
| 5,290,654 A | 3/1994 | Sacripante et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,348,832 A | 9/1994 | Sacripante et al. | |
| 5,364,729 A | 11/1994 | Kmiecik-Lawrynowicz et al. | |
| 5,366,841 A | 11/1994 | Patel et al. | |
| 5,370,963 A | 12/1994 | Patel et al. | |
| 5,403,693 A | 4/1995 | Patel et al. | |
| 5,405,728 A | 4/1995 | Hopper et al. | |
| 5,418,108 A | 5/1995 | Kmiecik-Lawrynowicz et al. | |
| 5,482,812 A | 1/1996 | Hopper et al. | |
| 5,496,676 A | 3/1996 | Croucher et al. | |
| 5,501,935 A | 3/1996 | Patel et al. | |
| 5,527,658 A | 6/1996 | Hopper et al. | |
| 5,585,215 A | 12/1996 | Ong et al. | |
| 5,650,255 A | 7/1997 | Ng et al. | |
| 5,650,256 A | 7/1997 | Veregin et al. | |
| 5,688,625 A | 11/1997 | Bertrand | |
| 6,416,918 B2 | 7/2002 | Matsumura et al. | |
| 6,503,677 B1 | 1/2003 | Gutman et al. | |
| 6,582,873 B2 | 6/2003 | Ojiang et al. | |
| 6,835,768 B2 * | 12/2004 | Agur et al. | ............ 524/487 |

* cited by examiner

*Primary Examiner*—Peter D Mulcahy
(74) *Attorney, Agent, or Firm*—Oliff & Berridge, PLC

(57) ABSTRACT

A wax emulsion comprised of polyethylene wax and one or more surfactants in an aqueous medium, wherein the polyethylene wax has a degree of crystallinity of from about 50% to about 80% by weight of the polyethylene wax, is provided. The wax emulsion is made by emulsifying the polyethylene wax, one or more surfactants and an aqueous medium in a vessel at a temperature at or above the melting point of the polyethylene wax to form an emulsified product, and subsequently cooling the emulsified product to ambient temperature at a cooling rate of at least 10° C. per minute. The wax emulsion is preferably incorporated into toner particles prepared by emulsion/aggregation/coalescing.

13 Claims, 1 Drawing Sheet

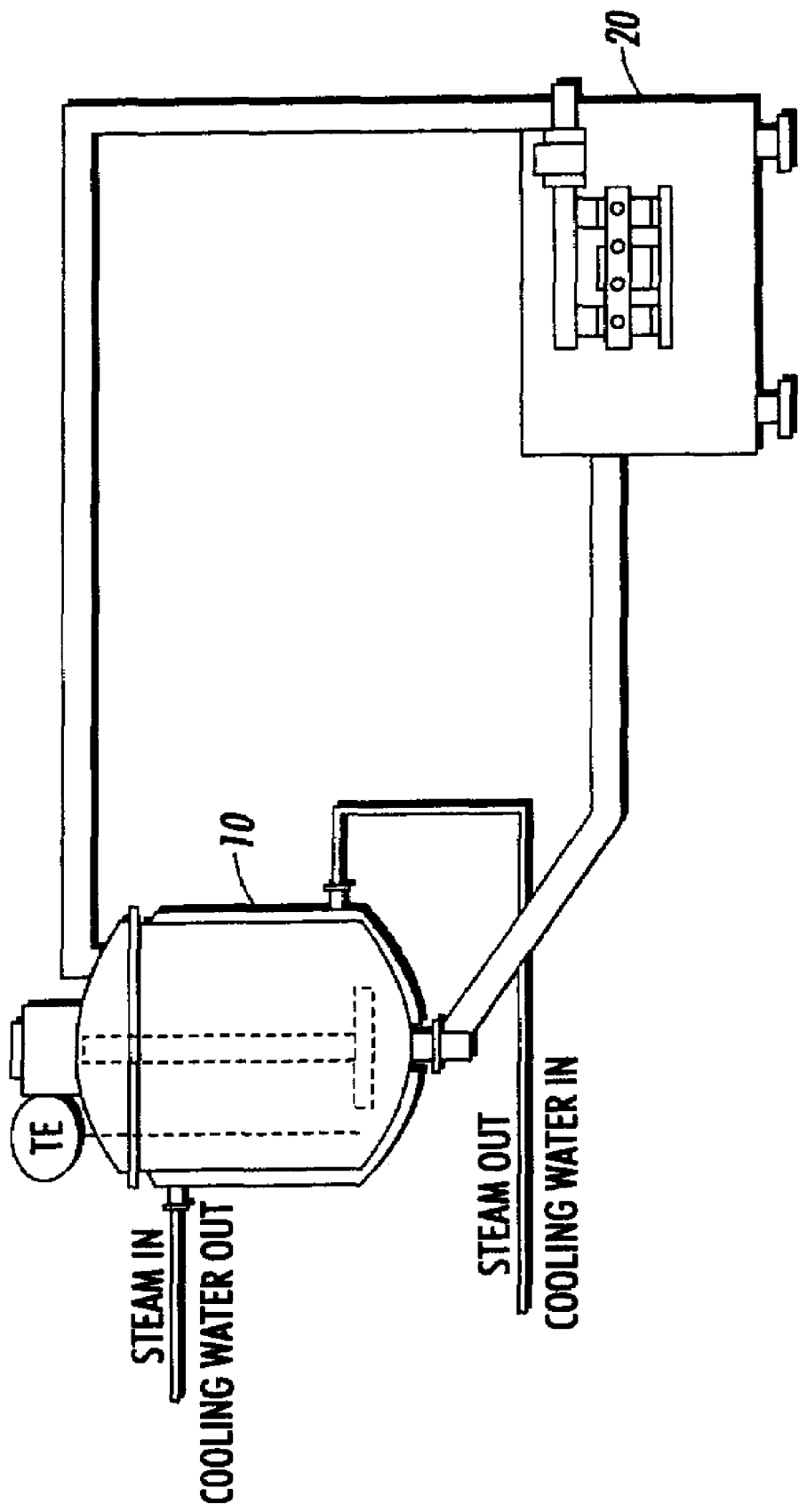

WAX EMULSION FOR EMULSION AGGREGATION TONER

CROSS-REFERENCE TO RELATED APPLICATIONS

The present application is a divisional application of application Ser. No. 10/859,967 filed Jun. 4, 2004. The disclosure of the prior application is hereby incorporated by reference in its entirety.

BACKGROUND

1. Field

The present disclosure relates to a wax emulsion comprised of polyethylene wax. The disclosure also relates to a method of making the wax emulsion, and to emulsion aggregation toners including the wax therein having a reduction of coarse particles.

2. Description of Related Art

In certain reprographic technologies, such as xerographic and ionographic devices, smaller sized toners having, for example, a volume average particle diameter of from about 2 to about 11 microns and preferably less than about 7 microns, are desired. For example, in xerographic systems wherein process color is utilized, such as pictorial color applications, small particle size colored toners, preferably of from about 3 to about 9 microns, are desired to avoid or minimize paper curling. Also, it is preferable to select small toner particle sizes, such as from about 1 to about 7 microns, and with higher colorant loading, such as from about 5 to about 12 percent by weight of toner, such that the mass of toner layers deposited onto paper is reduced to obtain the same quality of image and resulting in a thinner plastic toner layer on paper after fusing, thereby minimizing or avoiding paper curling.

One advantageous method for preparing such smaller size toner particles is known as the emulsion/aggregation/coalescing procedure. In this procedure, the toner is achieved via aggregation as opposed to mechanical particle size reduction. Emulsion/aggregation/coalescing processes for the preparation of toners are illustrated in a number of Xerox patents, the disclosures of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797. Also of interest may be U.S. Pat. Nos. 5,348,832, 5,405,728, 5,366,841, 5,496,676, 5,527,658, 5,585,215, 5,650,255, 5,650,256 and 5,501,935. In these methods, the toners are formed chemically in situ and do not require known pulverization and/or classification methods.

U.S. Pat. No. 6,582,873, incorporated herein by reference in its entirety, describes an emulsion aggregation toner made by a process in which aggregation is primarily controlled by utilizing a coagulant of polyaluminum chloride (PAC). A latex comprised of submicron resin particles of about 0.1 to about 0.4 micron in volume average diameter suspended in an aqueous phase of water, nonionic and anionic surfactants, a colorant dispersion comprising submicron colorant particles of about 0.08 to about 0.3 micron in volume average diameter, and optionally a wax dispersion comprised of submicron wax particles of about 0.1 to about 0.3 micron in volume average diameter, are added together and suspended in an aqueous phase of water and an anionic surfactant. The resultant blend is optionally stirred and heated to a temperature below the resin Tg, resulting in aggregates, the pH of the mixture is adjusted with a base, and the mixture is heated to a temperature above the resin Tg, followed by lowering the pH of the mixture with an acid to fuse the aggregates.

Waxes are added to toner formulations in order to aid toner release from the fuser roll, particularly in low oil or oil-less fuser designs. For emulsion aggregation toners, for example styrene-acrylate emulsion aggregation toners, linear polyethylene waxes such as POLYWAX® 725 (available from Baker Petrolite), are useful. To incorporate the wax into the toner, it is necessary for the wax to be in the form of an aqueous emulsion or dispersion of solid wax in water, where the solid wax particle size is usually in the range of from about 100 to about 500 nm.

Toners may contain and/or require a high amount of wax loading. For example, a styrene-acrylate emulsion aggregation toner may include 8 to 15% by weight pigment and 8 to 15% by weight wax. The combined high loading of pigment and wax, however, results in a problem that large disk shaped protrusions form at the toner particle surface during the cooling of the toner particle after coalescence. This disadvantageously can lead to formation of coarse toner particles and can cause development issues with respect to the distribution of surface additives on the toner surface.

Various solutions to this problem have been attempted, including utilization of higher melting waxes such as POLYWAX® 850, but this negatively impacts the toner minimum fixing temperature. Also attempted have been process changes such as cooling the toner particles at higher pH, but this results in formation of a rougher and less spherical toner particle.

U.S. Pat. No. 5,688,625, incorporated herein by reference, describes a process for minimizing the amount of wax that escapes from a toner, which comprises melt mixing toner resin and pigment, and injecting a water emulsified wax composition therein, wherein the generated wax domain size range is from about 50 to about 1,500 nanometers.

Although such procedures may reduce the occurrence of surface wax protrusions, a penalty is typically paid in another area such as in poorer toner performance or reduced process latitude. What is desired, then, is a procedure to readily and reliably reduce the occurrence of toner particle surface wax protrusions without compromising toner performance or limiting performance latitude.

SUMMARY

The disclosure thus relates to improvements in wax emulsion morphology and formation processes such that it is not necessary to use higher melting waxes and/or change toner process conditions that can limit process latitude.

A first embodiment pertains to a wax emulsion comprised of polyethylene wax and one or more surfactants in an aqueous medium, wherein the wax emulsion contains wax having a degree of crystallinity from greater than zero to less than about 80 percent, and preferably less than 75 percent by weight of wax.

In a further embodiment, a method of making such a wax emulsion is provided, the method comprising emulsifying at least the polyethylene wax, one or more surfactants and an aqueous medium in a vessel at a temperature at or above the melting point of the polyethylene wax to form an emulsified product, and subsequently cooling the emulsified product to ambient temperature at a cooling rate of at least 10° C. per minute.

In a still further embodiment, the disclosure relates to toner particles prepared by the aforementioned method, that is, toner particles comprising at least a binder, a polyethylene wax and a colorant, and where said polyethylene wax has a degree of crystallinity from greater than zero to less than about 80 percent, and preferably less than 75 percent by weight of wax.

Toners prepared by the process of the present disclosure possess a number of advantages as compared to toners generated by known emulsion aggregation processes, which advantages include, for example, the ability to control the occurrence of wax domains at the toner surface during toner cooling after coalescence, resulting in satisfactory particle size and particle size distribution and stable toner triboelectric charging performance.

The toners generated with the processes of the present disclosure are especially useful for imaging processes, especially xerographic processes, which usually prefer a toner transfer efficiency in excess of greater than about 90 percent, such as those with a compact machine design without a cleaner or those that are designed to provide high quality colored images with excellent image resolution, acceptable signal-to-noise ratio, and image uniformity. Also, the toners obtained with the processes illustrated herein can be selected for digital imaging systems and processes.

BRIEF DESCRIPTION OF THE DRAWING

The FIGURE illustrates an example homogenization system.

EMBODIMENTS

Emulsions, by the classical definition, are mixtures of two immiscible liquids stabilized by an emulsifier. By this classical definition, in the case of wax, an emulsion technically exists only when the wax is in its molten state as the emulsion is formed. However, the terminology "wax emulsion" has become widely used in the industry to describe also the final product, and so is used in this same manner in the present disclosure, that is, in the manner accepted within the industry. Further, wax emulsions are also referred to as "wax dispersions," these two terms being synonymous and referring to the same entity.

The wax emulsion is usually added to a toner formulation together with latex binder, pigment dispersion and other optional components at the start of the toner aggregation process as is further explained below.

As the wax of the wax emulsion, linear polyethylene waxes, such as, for example, available under the trade name POLYWAX®, are particularly useful for emulsion aggregation toner applications. Linear polyethylene waxes such as POLYWAX® are semi-crystalline in nature and are characterized by a melting point which is a function of the molecular weight. The melting point, number average molecular weight and molecular weight distribution (MWD) of a series of linear polyethylene waxes available from Baker Petrolite is shown in Table 1.

TABLE 1

| | Mn | MWD (Mw/Mn) | Drop Melting Point (° C.)* |
|---|---|---|---|
| POLYWAX ® 500 | 500 | 1.08 | 88 |
| POLYWAX ® 725 | 725 | 1.08 | 104 |
| POLYWAX ® 850 | 850 | 1.08 | 107 |
| POLYWAX ® 1000 | 1,000 | 1.08 | 113 |

* ASTM D127, "Drop Melting Point of Petroleum Wax"

Although these waxes are characterized by a specific melting point, melting in fact takes place over a wide temperature range. This is due to the breadth of the molecular weight distribution.

The stable aqueous wax emulsion contains polyethylene wax particles and one or more stabilizers, such as for example surfactants, in an aqueous medium. Linear polyethylene wax is a preferred wax. The content of wax in the emulsion is in the range of from, for example, about 5 to about 50% by weight of the wax emulsion. The polyethylene wax particles preferably have an average diameter in the range of from about 100 to about 500 nm as measured with, for example, a MICROTRAC® UPA150 particle size analyzer. The polyethylene wax particles also preferably have a peak melting point in the range of from about 80° C. to about 120° C. and an onset melting point in the range of from about 60° C. to about 100° C. as measured, for example, by differential scanning calorimetry (DSC).

The morphology of the preferred wax contained in the emulsion is semi-crystalline, wherein the degree of crystallinity ranges from about 50 to about 99% by weight of the wax as measured by DSC. A particularly preferred polyethylene wax in the wax emulsion is the linear polyethylene wax POLYWAX® 725 available from Baker Petrolite.

The wax emulsion is stabilized with one or more surfactants. Any type of surfactant may be used, with anionic, cationic or nonionic surfactants being preferred.

Anionic surfactants include sodium dodecylsulfate (SDS), sodium dodecyl benzene sulfonate, sodium dodecylnaphthalene sulfate, dialkyl benzenealkyl, sulfates and sulfonates, abitic acid, and the NEOGEN™ brand of anionic surfactants. Examples of preferred anionic surfactants are NEOGEN R-K™ available from Daiichi Kogyo Seiyaku Co. Ltd., Japan and TAYCAPOWER BN2060 available from Tayca Corp., Japan, both which consists primarily of branched sodium dodecyl benzene sulphonate.

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride), available from Kao Chemicals, and the like. An example of a preferred cationic surfactant is SANISOL B-50 available from Kao Corp., which consists primarily of benzyl dimethyl alkonium chloride.

Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897. An example of a preferred nonionic surfactant is ANTAROX 897 available from Rhone-Poulenc Inc., which consists primarily of alkyl phenol ethoxylate.

The amount of surfactant or stabilizer required to stabilize the wax emulsion is not critical, and often depends on the structure of the surfactant itself. As a general guideline, amounts of surfactants need to produce a stable wax emulsion are in the range of from about 0.1 to about 15 parts per hundred surfactant-to-wax, preferably from about 1.0 to about 5.0 parts per hundred surfactant-to-wax.

The aqueous medium consists primarily of water. For best results in forming a stable wax emulsion for toner application, use of deionized water is preferred.

The morphology of the preferred wax contained in the emulsion is dependent upon the conditions of cooling of the wax from the molten state, and more specifically, the rate of cooling of the wax. Being that the linear polyethylene wax is semi-crystalline in nature, when the molten wax is cooled, wax crystallites form. It is to be understood that the degree of crystalline formation or crystallinity and size of the crystallites formed depends on the rate of cooling. Faster cooling of the molten linear polyethylene wax generally results in a lower degree of crystallinity and smaller sized crystallites. As such, it is helpful to understand how wax emulsions are formed.

A process to fabricate the wax emulsion comprises the steps of emulsifying the polyethylene wax, the one or more surfactants and the aqueous medium in a vessel at a temperature at or above the melting point of the polyethylene wax to form an emulsified product, and subsequently cooling the emulsified product to ambient temperature at a cooling rate of at least 10° C. per minute. If the temperature in the process exceeds 100° C., then elevated pressure in the vessel is preferred in order to keep the aqueous components of said vessel in liquid state.

A sample system for carrying out the process is illustrated in the FIGURE. The system includes a homogenizer 20, for example a Gaulin 15MR homogenizer available from APV Homogenizer Group, and a reactor 10. While any suitable reactor vessel may be used without restriction, it is most preferred to use a reactor that includes a jacket having steam heating and water cooling capabilities.

At least the polyethylene wax, surfactant or stabilizer and the water are mixed together in the reactor. Other optional components such as, for example, compatibilizers, may also be included in the mixture. The mixture is preferably stirred and heated to a temperature higher than the melting point of the wax in order to melt the wax. Typically, the desired temperature of heating is at least 10° C. or more above the melting point of the wax, more preferably about 15° C. to about 35° C. above the melting point of the wax. A higher heating temperature usually results in a smaller wax particle size in the wax emulsion product. Thus, for example, when using POLY-WAX® 725, which has a melting point of about 104° C., the mixture may preferably be heated to a temperature in the range from about 120° C. to about 135° C. Use of a reactor that is sealed and includes a circulation system that can operate at above atmospheric pressure is preferred to effect this heating.

Once the desired heating temperature is achieved, the heated mixture is then pumped through the homogenizer 20. Any suitable homogenizer capable of forming a wax emulsion may be used without limitation. Preferably, a two-stage homogenizer is utilized which includes at least two homogenizing valves in series, a first valve that operates at high pressure, for example up to 8,000 pounds per square inch or more, during homogenization and a second valve that operates at lower pressure, for example of up to only about 1,000 pounds per square inch. Such a homogenizer is preferably operated initially in a pre-emulsification mode in which the first homogenizing valve is fully opened and the second homogenizing valve is partially closed in order to generate a pressure drop on the order of about, for example, 800 to about 1,000 pounds per square inch. The wax mixture may be pre-emulsified for a desired period of time, for example up to about eight theoretical passes (the time for one theoretical pass being defined by the mixture volume divided by the volumetric flow rate through the homogenizer; thus, for a four liter mixture pumped at one liter per minute, one theoretical pass takes about four minutes).

Following pre-emulsification, the first homogenizing valve is partially closed to increase the homogenizer pressure to a desired higher pressure, for example in the range of from about 3,000 to 10,000 pounds per square inch, preferably from about 3,000 to about 8,000 pounds per square inch. Emulsification is then carried out for a number of theoretical passes ranging from, for example, about 2 to about 20 passes, preferably from about 5 to about 15 passes. Operating at a higher pressure for a longer time results in formation of smaller wax particles in the product.

Homogenization is a known process for producing an emulsion. As stated above, an emulsion is a mixture of two immiscible liquids stabilized by an emulsifier or surfactant where one liquid (for example, water) is the continuous phase and the other liquid (for example, oil or wax) is the discontinuous or droplet phase. Typically, emulsion particle sizes are obtained in the range of from 100 to 500 nm depending on the material properties and homogenization conditions.

As stated above, to produce the wax emulsion, the wax must first be melted. Only when the wax is molten is it possible to reduce its particle size by emulsification. Emulsifiers or surfactants are added to the aqueous wax mixture in order to stabilize the wax emulsion and prevent reagglomeration and recoalescence after exiting from the homogenizer. In the case of waxes having melting points above 100° C., as stated above, it is further preferable to carry out the emulsification under elevated pressure in order to keep the mixture in its liquid state. The circulation system such as shown in the FIGURE is thus suitable. The mixture is circulated through the homogenizer by means of the pumping action of the homogenizer that acts like a positive displacement pump.

In a typical wax homogenization process, the wax and one or more surfactants are added to deionized water in a high pressure reactor and stirred. The components may be added together to form the reactor mixture in any order without restriction. Additional optional components such as compatibilizers may also be added either to the reactor mixture or to the wax emulsion formed by the emulsification procedure. The reactor mixture is heated to a temperature above the melting point of the wax in order to substantially completely melt the wax. The aqueous mixture containing the molten wax is then pumped through the high pressure homogenizer in the pre-emulsification and emulsification steps discussed above. Once emulsified, the homogenizer is stopped and the reactor mixture is cooled to ambient temperature, that being for example, from about 20° C. to about 40° C., discharged from the homogenization system, and optionally filtered through a filter bag, for example a filter bag having a pore size of about 1 to about 50 microns.

The procedure for cooling the product after homogenization determines the wax morphology in the emulsion, and more specifically, the degree of crystal formation or crystallinity. Preferably, the wax emulsion has a low degree of crystallinity, which means that the degree of crystallinity of the wax is from greater than about 50 percent to less than about 80 percent by weight of the wax, and preferably from about 50 percent to less than about 75 percent by weight of the wax as measured by DSC. Measurement of the degree of crystallinity of the wax emulsion is carried out relative to a sample of highly annealed wax by the following method, wherein the annealed wax is preferably from the same lot of wax as used to produce the emulsion. A sample of polyethylene wax is melted and then cooled and annealed for a period of about 2 hours to effect substantially 100 percent degree of crystallinity as determined by x-ray crystallography. The annealed sample is then heated to above its melting point in a DSC at a rate of 1° C. per minute to determine its heat of fusion. The corresponding dried wax emulsion is similarly heated to above its melting point at a rate of 1° C. per minute to determine its heat of fusion. The degree of crystallinity of the emulsion is calculated by dividing the heat of fusion of the dried emulsion sample by its wax content and dividing this value by the heat of fusion of the annealed wax sample.

In order to obtain the wax emulsion, it has been determined that the homogenized wax emulsion must be cooled from the emulsification temperature down to ambient (room) temperature at a rate of at least 10° C. per minute, preferably at a rate of about 10° C. per minute to about 25° C. per minute. This rapid rate of cooling may be achieved by any suitable method. For example, providing a cooling liquid through the reactor jacket may effect the rapid cooling, particularly in smaller reactors. For larger size reactors, however, the cooling may be effected by, or at least assisted by, a heat exchanger through which the formed wax emulsion is discharged.

It has further been determined that the wax morphology as established in the present method of making the wax emulsion is important with respect to the use of the wax emulsion in an emulsion aggregation toner. It has been shown that fast cooled wax emulsion, that is wax emulsion cooled at a rate of about 10° C. per minute and having degree of crystallinity below 75 percent by weight of the wax, is advantaged over slow cooled wax emulsion having degree of crystallinity greater than 75 percent by weight of wax, with respect to lower coarse toner particle formation during toner cooling after coalescence. In the toner emulsion aggregation process, the temperatures used are typically not high enough to fully remelt the wax. For example, typical emulsion aggregation toner forming processes utilize maximum temperatures of less than 100° C., which temperatures are typically below the melting points of the polyethylene waxes added to the emulsion aggregation toner. As such, it is expected that only a small proportion of the wax present in the wax emulsion would be melted in a toner formation process. Further, the heating up to and cooling down from temperatures below 100° C. in the emulsion aggregation toner formation process may be above a temperature at which wax solidification and crystallization occurs. Thus, one might expect that some additional wax crystallization may take place in the toner as the emulsion aggregation toner is cooled from the formation temperature. Therefore, as the wax is not totally melted but is allowed to further crystallize during toner coalescence and spherodization, it is determined that the morphology of the wax in the initial wax emulsion has a significant effect on a morphology of the wax in the final toner product after cooling.

Thus, linear polyethylene wax emulsions formed by rapid cooling after homogenization are advantaged over slow cooled wax emulsions with respect to having lower degree of crystallinity and resulting in lower coarse toner particle size formation after aggregation/coalescence in toner formation as discussed above.

The wax emulsion is most preferably used as an additive to an emulsion aggregation toner. The disclosure thus further comprises mixing the wax emulsion with toner components comprising at least a latex binder and one or more colorants, as well as with one or more additional surfactants and one or more optional coagulants. The mixture is then aggregated to form toner particles, which toner particles are subsequently coalesced, recovered and optionally washed to obtain emulsion aggregation toner particles that include the polyethylene wax having small size wax crystallites.

Any suitable emulsion aggregation procedure may be used in forming the emulsion aggregation toner particles without restriction. These procedures include the basic process steps of at least aggregating an emulsion containing binder, one or more colorants, one or more surfactants, the wax emulsion and one or more additional optional additives to form aggregates, subsequently coalescing or fusing the aggregates, and then recovering, optionally washing and optionally drying the obtained emulsion aggregation toner particles.

An example emulsion/aggregation/coalescing process preferably includes forming a mixture of latex binder and the aqueous wax emulsion and deionized water in a vessel. The mixture is then stirred using a homogenizer. A colorant dispersion of the one or more colorants dispersed in an aqueous solution is then added to the mixture along with an optional coagulant. The mixture is then homogenized and transferred to a reactor where the homogenized mixture is heated at 1° C./min. to a temperature of about 50° C. and held at such temperature for a period of time to permit aggregation of toner particles to the desired size. Once the desired size of aggregated toner particles is achieved, the pH of the mixture is adjusted in order to inhibit further toner aggregation. The toner particles are further heated to a temperature of about 90° C. and the pH lowered in order to enable the particles to coalesce and spherodize. The heater is then turned off and the reactor mixture allowed to cool to room temperature, at which point the aggregated and coalesced toner particles are recovered and optionally washed and dried.

Non-limiting illustrative examples of latex resin binders of the toner include, for example, polymers such as poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and the like. The latex is generally present in the toner composition in various suitable amounts, such as from about 75 weight percent to about 98, or from about 80 to about 95 weight percent, of the toner or of the solids.

The polymer selected can be prepared by emulsion polymerization methods, and the monomers utilized in such processes may include any of, for example, styrene, acrylates such as methacrylates, butylacrylates, β-carboxy ethyl acrylate (β-CEA), etc., butadiene, isoprene, acrylic acid, methacrylic acid, itaconic acid, acrylonitrile, benzenes such as divinylbenzene, etc., and the like. Known chain transfer agents, for example dodecanethiol or carbon tetrabromide, can be utilized to control the molecular weight properties of the polymer. Other processes for obtaining polymer particles may also be used, such as polymer solution microsuspension processes, etc.

Various known colorants, such as pigments and dyes, may be present in the toner in an amount of, for example, from about 1 to about 25 percent by weight of toner, and preferably in an amount of from about 3 to about 10 percent by weight of toner. Suitable colorants include, without limitation, carbon black, magnetites, etc. As colored pigments, there can be selected cyan, magenta, yellow, red, green, brown, blue or mixtures thereof. Colorants include pigments, dyes, mixtures of pigment and dyes, mixtures of pigments, mixtures of dyes, and the like.

Surfactants for the preparation of the toner emulsion can be ionic, anionic or nonionic surfactants, and are present in amounts of, for example, from about 0.01 to about 15, or from about 0.01 to about 5, weight percent of the mixture. The surfactants may be the same as any of those identified above with respect to the wax emulsion.

Suitable optional coagulants include any coagulant known or used in the art. A preferred coagulant is polyaluminum chloride (PAC).

The toner may also include known charge additives in effective suitable amounts of, for example, from 0.1 to 5 weight percent of the toner, such as alkyl pyridinium halides, bisulfates, the charge control additives of U.S. Pat. Nos. 3,944,493; 4,007,293; 4,079,014; 4,394,430 and 4,560,635, negative charge enhancing additives like aluminum complexes, other known charge additives, and the like.

External toner surface additives that can be added to the toner compositions after washing or drying include, for example, metal salts, metal salts of fatty acids, colloidal silicas, metal oxides, strontium titanates, mixtures thereof, and the like, which additives are each usually present in an amount of from about 0.1 to about 2 weight percent of the toner. Preferred additives include zinc stearate and AEROSIL R972 available from Degussa.

Developer compositions can be prepared by mixing the toners obtained with known carrier particles, including coated carriers, such as steel, ferrites, and the like. The carrier particles can also be comprised of a core with a polymer coating thereover, such as polymethylmethacrylate (PMMA), having dispersed therein a conductive component like conductive carbon black. Carrier coatings include silicone resins, fluoropolymers, mixtures of resins not in close proximity in the triboelectric series, thermosetting resins, and other known components.

Examples of some embodiments of the present disclosure will now be set forth and explained. The scope of the claims is not limited to, nor meant to be limited to, the following examples.

Latex Reference I—Non-Crosslinked Latex

A latex emulsion comprised of polymer particles generated from the emulsion polymerization of styrene, butyl acrylate and beta carboxy ethyl acrylate (β-CEA) is prepared as follows. A surfactant solution of about 434 grams of DOWFAX 2A1™ (anionic surfactant) and about 387 kilograms of deionized water is prepared by mixing for about 10 minutes in a stainless steel holding tank. The holding tank is then purged with nitrogen for about 5 minutes before transferring the mixture into a reactor. The reactor is then continuously purged with nitrogen while being stirred at about 100 revolutions per minute. The reactor is then heated to about 80° C. Separately, about 6.11 kilograms of ammonium persulfate initiator are dissolved in about 30.2 kilograms of deionized water. Separately, a monomer emulsion is prepared by mixing about 315.7 kilograms of styrene, about 91.66 kilograms of butyl acrylate, about 12.21 kilograms of β-CEA, about 7.13 kilograms of 1-dodecanethiol, about 1.42 kilograms of decanediol diacrylate (ADOD), about 8.24 kilograms of DOWFAX 2A1™ anionic surfactant, and about 193 kilograms of deionized water. About five percent of the above emulsion is then slowly fed into the reactor containing the aqueous surfactant phase at about 80° C. to form the seeds, wherein the "seeds" refer, for example, to the initial emulsion latex added to the reactor, prior to the addition of the initiator solution, while being purged with nitrogen. The above initiator solution is then slowly charged into the reactor, forming about 5 to about 12 nanometers of latex seed particles. After about 10 minutes, the remainder of the emulsion is continuously fed in using metering pumps. Once all of the above monomer emulsion is charged into the main reactor, the temperature is maintained at about 80° C. for about an additional 2 hours to complete the reaction. The reactor contents are then cooled down to about 25° C. The resulting isolated product comprises about 40 percent by weight of submicron (for example, about 200 nanometer) resin particles of styrene/butylacrylate/β-CEA suspended in an aqueous phase containing the above surfactant. The molecular properties resulting for the resin latex throughout are a Mw of about 39,000, Mn of about 10,800 as measured by a gel permeation chromatograph (GPC), and a midpoint glass transition temperature (Tg) of about 55.8° C. as measured by a differential scanning calorimeter (DSC), where the midpoint Tg is defined as the halfway point between the onset and the offset Tg of the polymer.

Latex Reference II—Gel Latex

A latex emulsion comprised of polymer particles generated from the emulsion polymerization of styrene, butyl acrylate, divinylbenzene (55 percent grade) and beta carboxy ethyl acrylate (β-CEA) is prepared as follows. A surfactant solution of about 2.92 kilograms of NEOGEN R-K™ anionic surfactant and about 162.0 kilograms of deionized water is prepared by mixing for about 10 minutes in a stainless steel holding tank. The holding tank is then purged with nitrogen for about 5 minutes before transferring the mixture into a reactor. The reactor is then continuously purged with nitrogen while being stirred at about 90 revolutions per minute. The reactor is then heated to about 75° C. Separately, about 1.38 kilograms of ammonium persulfate initiator are dissolved in about 14.58 kilograms of deionized water. Separately, a monomer emulsion is prepared by mixing about 52.65 kilograms of styrene, about 28.35 kilograms of butyl acrylate, about 810.0 grams divinylbenzene (55 percent grade), about 2.43 kilograms of β-CEA, about 6.80 kilograms of NEOGEN R-K™ anionic surfactant, and about 87.48 kilograms of deionized water. About 1.5 percent of the above emulsion is then slowly fed into the reactor containing the aqueous surfactant phase at about 75° C. to form the seeds, wherein the "seeds" refer, for example, to the initial emulsion latex added to the reactor, prior to the addition of the initiator solution, while being purged with nitrogen. The above initiator solution is then slowly charged into the reactor, forming about 5 to about 12 nanometers of latex "seed" particles. After about 10 minutes, the remainder of the emulsion is continuously fed in using metering pumps. Once all of the above monomer emulsion is charged into the main reactor, the temperature is maintained at 75° C. for about an additional 2 hours to complete the reaction. The reactor contents are then cooled down to about 25° C. The resulting isolated product comprises about 24 percent by weight of submicron, about 50 nanometer, resin particles of styrene/butylacrylate/divinylbenzene/β-CEA suspended in an aqueous phase containing the above surfactant. The molecular properties resulting for the gel latex throughout have a Mw of about 417,500, Mn of about 31,500 as measured by GPC, and a midpoint Tg of about 46.1° C. as measured by DSC.

Wax Emulsions of Examples I, II and III

In each of the following examples, an emulsion is produced in accordance with a procedure described herein and containing 19 percent by weight POLYWAX® 725 and about 0.5 percent by weight NEOGEN R-K™ anionic surfactant. In each of the runs, about 765 grams of POLYWAX® 725 polyethylene wax and about 19 grams of NEOGEN R-K™ anionic surfactant are added to about 3,016 grams of deionized water in a 1 gallon reactor and stirred at about 400 revolutions per minute. Each reactor mixture is heated to about 130° C. in order to melt the wax. The aqueous mixture containing the molten wax is then pumped through a Gaulin 15MR piston homogenizer at about 1 liter per minute for a period of about 30 minutes with the primary homogenizing valve full open and the secondary homogenizing valve partially closed such that the homogenizing pressure is about 1,000 pounds per square inch. Then the primary homogenizing valve is partially closed such that the homogenizing pressure increases to about 8,000 pounds per square inch. The reactor mixture is still kept at about 130° C. and circulated through the homogenizer at about 1 liter per minute for about 60 minutes. Thereafter, the homogenizer is stopped and the reactor mixture is cooled from 130° C. to 40° C. in the time shown in Table 2, discharged into a product container and screened through a five micron polyester filter bag. The volume average diameter as measured with a HONEYWELL MICROTRAC® UPA150 particle size analyzer and degree of crystallinity as measured by DSC for each product is shown in Table 2.

TABLE 2

Wax emulsions of Examples I, II and III.

| Emulsion | Cooling Time (min) | Wax Content (%) | Volume Average Diameter (nm) | Degree of Crystallinity (%) |
|---|---|---|---|---|
| I | 5 | 19.0 | 241 | 72 |
| II | 45 | 19.4 | 259 | 85 |
| III | 180 | 19.1 | 253 | 91 |

Wax Emulsions of Examples IV and V

Two further emulsions containing about 30% by weight POLYWAX® 725 and 0.75% by weight NEOGEN R-K™ anionic surfactant are prepared in which the emulsifications are carried out in a large scale process. These emulsions are summarized in Table 3.

TABLE 3

Wax emulsions of Examples IV and V.

| Emulsion | Cooling Time (mm) | Wax Content (%) | Volume Average Diameter (nm) | Degree of Crystallinity (%) |
|---|---|---|---|---|
| IV | 45 | 29.3 | 266 | 87 |
| V | 45 | 30.3 | 233 | 88 |

Toners of Examples VI, VII and VII

Toners are produced with each of the above wax emulsions of Examples I, II and III according to the following process. About 191.4 grams of the latex of Latex Reference I, about 73.7 grams of the gel latex of Latex Reference II, about 85.2 grams of aqueous wax Emulsion I, II or III as set forth above containing about 16.2 grams POLYWAX® 725 and about 0.4 grams NEOGEN R-K™ anionic surfactant are added to about 459.2 grams of deionized water in a vessel and stirred using an IKA ULTRA TURRAX® T50 homogenizer operating at about 4,000 revolutions per minute. Thereafter, about 113.5 grams of black pigment dispersion containing about 18.0 grams REGAL® 330 carbon black and about 1.3 grams NEOGEN R-K™ anionic surfactant is added to each above mixture followed by drop-wise addition of about 30.6 grams of a flocculent mixture containing about 3.1 grams polyaluminum chloride mixture and about 27.5 grams 0.02 molar nitric acid solution. As the flocculent mixture is added drop-wise in each case, the homogenizer speed is increased to about 5,200 revolutions per minute and homogenized for about an additional 5 minutes. Thereafter, each mixture is transferred to a 2 liter glass reactor and heated at about 1° C. per minute to a temperature of about 49° C. and held there for a period of about 1.5 to about 2 hours resulting in a volume average particle diameter of about 5 microns as measured with a Coulter Counter. During the heat up period, the stirrer is run at about 250 revolutions per minute and about 10 minutes after the set temperature of about 49° C. is reached, the stirrer speed is reduced to about 220 revolutions per minute. About an additional 124.6 grams of Latex Reference I is added to each reactor mixture and allowed to aggregate for an additional period of about 30 minutes at about 49° C. resulting in a volume average particle diameter of about 5.5 microns. The particle size is frozen by adjusting the reactor mixture pH to about 7 by adding about 1.0 molar sodium hydroxide solution. Thereafter, each reactor mixture is heated at about 1° C. per minute to a temperature of about 93° C., followed by adjusting the reactor mixture pH to about 3.9, then about 30 minutes later to about 3.5 and then about 30 minutes later to about 3.3 by adding about 0.3 molar nitric acid solution. Following this, the reactor mixture is continued to be stirred at about 93° C. for about 4 hours to enable the particles to coalesce and spherodize. The reactor heater is then turned off and the reactor mixture is allowed to cool to room temperature overnight, typically for about 10 to about 12 hours.

The resulting three toner mixtures are comprised of about 16.7 percent of toner, 0.4 percent of anionic surfactant and about 82.7 percent by weight of water. Each toner of said mixture comprises about 81 percent of styrene/butyl acrylate/beta carboxy ethyl acrylate copolymer, about 10 percent of pigment and about 9 percent by weight of wax. The volume average particle size diameter and volume particle size distribution (GSDv), as measured by a Coulter Counter, of each of the three toners is summarized in Table 4 below.

Toners of Examples IX and X

Further two toners are produced with each of the above wax emulsions of Examples IV and V according to the following process. About 191.4 grams of the latex of Latex Reference I, about 73.7 grams of the gel latex of Latex Reference II, about 55.3 grams of aqueous wax Emulsion IV or V as set forth above containing about 16.2 grams POLYWAX® 725 and about 0.4 grams NEOGEN R-K™ anionic surfactant are added to about 489.0 grams of deionized water in a vessel and stirred using an IKA ULTRA TURRAX® T50 homogenizer operating at about 4,000 revolutions per minute. Thereafter, about 113.5 grams of black pigment dispersion containing about 18.0 grams REGAL®330 carbon black and about 1.3 grams NEOGEN R-K™ anionic surfactant is added to each above mixture followed by drop-wise addition of about 30.6 grams of a flocculent mixture containing about 3.1 grams polyaluminum chloride mixture and about 27.5 grams 0.02 molar nitric acid solution.

Thereafter, the procedure of Examples VI, VII and VIII are carried out to completion as described above.

The resulting two toner mixtures are comprised of about 16.7 percent of toner, 0.4 percent of anionic surfactant and about 82.7 percent by weight of water. Each toner of said mixture comprises about 81 percent of styrene/butyl acrylate/beta carboxy ethyl acrylate copolymer, about 10 percent of pigment and about 9 percent by weight of wax. The volume average particle size diameter and volume particle size distribution (GSDv), as measured by a Coulter Counter, of each of the three toners is summarized in Table 4.

TABLE 4

Toners of Examples VI to X.

| Toner | Emulsion | Emulsion Cooling Time (min) | Degree of Wax Crystallinity (%) | Volume Average Diameter (nm) | GSDv |
|---|---|---|---|---|---|
| VI | I | 5 | 72 | 5.98 | 1.37 |
| VII | II | 45 | 85 | 6.44 | 1.35 |
| VIII | III | 180 | 91 | 7.46 | 1.46 |
| IX | IV | 45 | 87 | 7.37 | 1.46 |
| X | V | 45 | 88 | 8.64 | 1.56 |

Comparing the toners of Examples VI to VIII, it is clear from the obtained particle size distributions that increasing the cooling rate in the wax emulsion and decreasing the degree of crystallinity results in a toner with less coarse particle growth. The toners of Examples IX and X also have severe coarse particle growth due to the presence of slow cooled wax emulsions.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of preparing a wax emulsion comprised of polyethylene wax and one or more surfactants in an aqueous medium, wherein the polyethylene wax has a degree of crystallinity of from about 50% to about 80% by weight of the polyethylene wax, comprising:
    emulsifying at least the polyethylene wax, the one or more surfactants and the aqueous medium in a vessel at a temperature at or above the melting point of the polyethylene wax to form an emulsified product, and
    subsequently cooling the emulsified product to ambient temperature at a cooling rate of about 10° C. to about 25° C. per minute; and
    wherein the polyethylene wax is a linear polyethylene wax.

2. The method according to claim 1, wherein the vessel is a homogenizer.

3. The method according to claim 1, wherein the cooling is effected at least in part by passing cold water through a jacket of the vessel.

4. The method according to claim 1, wherein the cooling is effected at least in part by discharging the emulsified product from the vessel and through a heat exchanger.

5. The method according to claim 1, wherein in the emulsifying, the vessel is under an elevated pressure of at least about 1,000 psi.

6. The method according to claim 5, wherein the elevated pressure in the emulsifying is from about 3,000 to about 10,000 psi.

7. The method according to claim 1, wherein the method further comprises, prior to the emulsifying, pre-emulsifying the polyethylene wax, the one or more surfactants and the aqueous medium at a pressure that is lower than the elevated pressure in the emulsifying.

8. The method according to claim 7, wherein the pressure in the pre-emulsifying is 1,000 psi or less.

9. The method according to claim 8, wherein in the emulsifying, the vessel is under an elevated pressure of at least about 1,000 psi.

10. The method according to claim 1, wherein the method further comprises mixing the cooled emulsified product with at least a latex binder, a colorant, one or more additional surfactants and optionally one or more coagulants to form a mixture, aggregating the mixture to form toner particles, subsequently coalescing the toner particles, and recovering the toner particles, thereby forming toner particles including the polyethylene wax.

11. The method according to claim 1, wherein the degree of crystallinity is from about 50% to about 75% by weight of the polyethylene wax.

12. The method according to claim 1, wherein the degree of crystallinity is from about 50% to less than 75% by weight of the polyethylene wax.

13. The method according to claim 1, wherein the degree of crystallinity is from about 50% to 72% by weight of the polyethylene wax.

* * * * *